Jan. 14, 1969 F. S. GUTLEBER 3,422,348
HIGH RESOLUTION FREQUENCY SPECTRUM ANALYZER
Filed Oct. 12, 1965
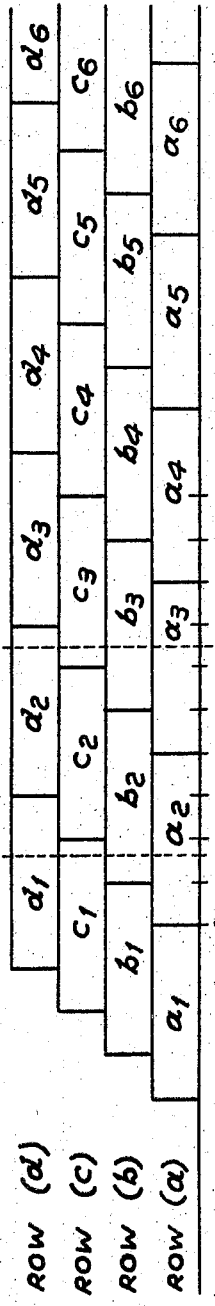
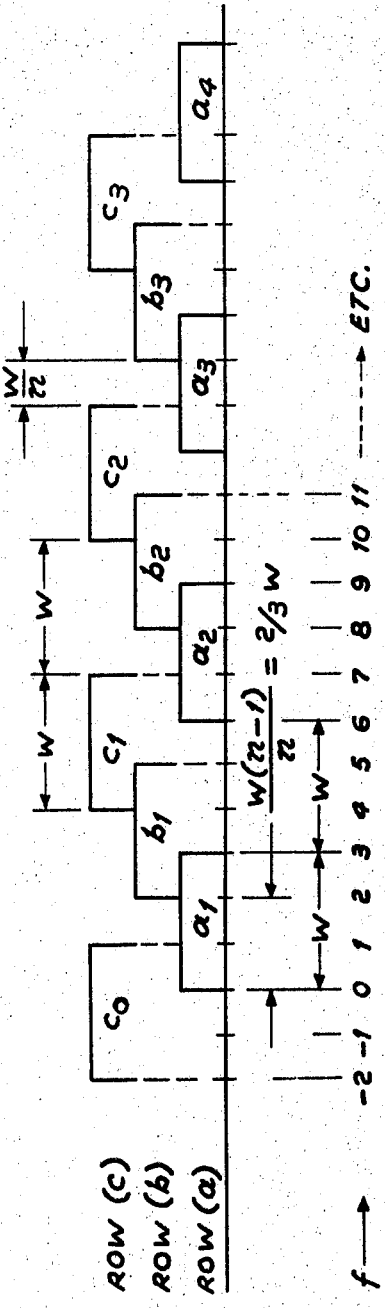
INVENTOR.
FRANK S. GUTLEBER

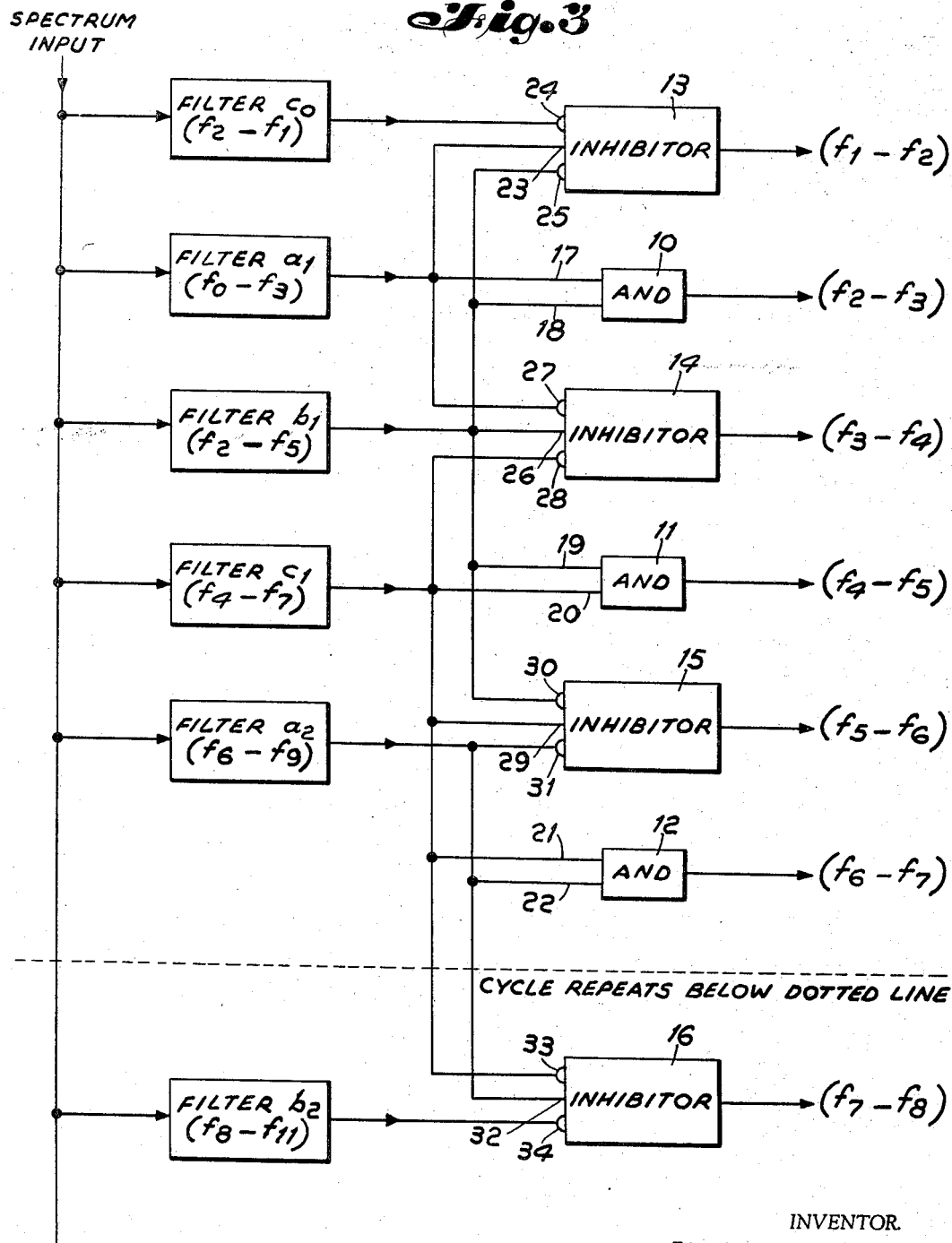

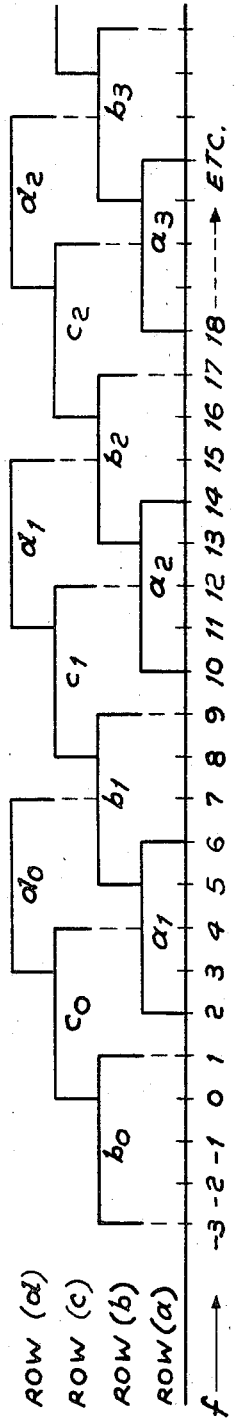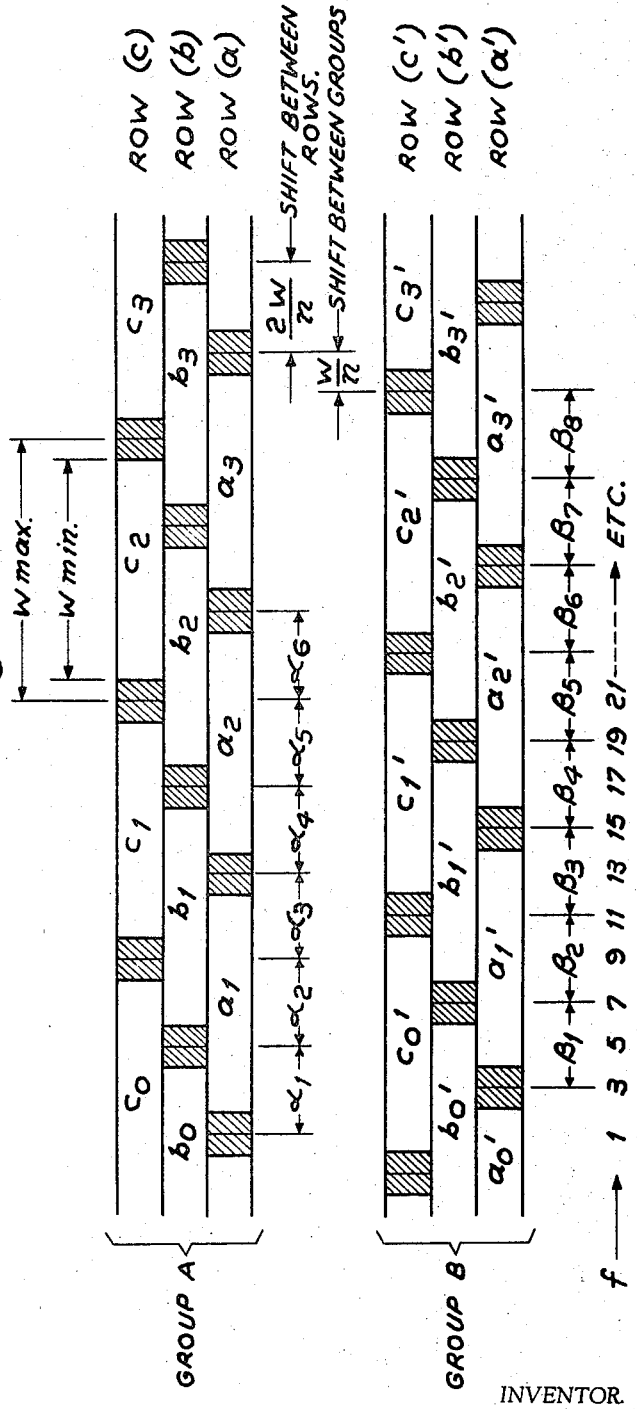

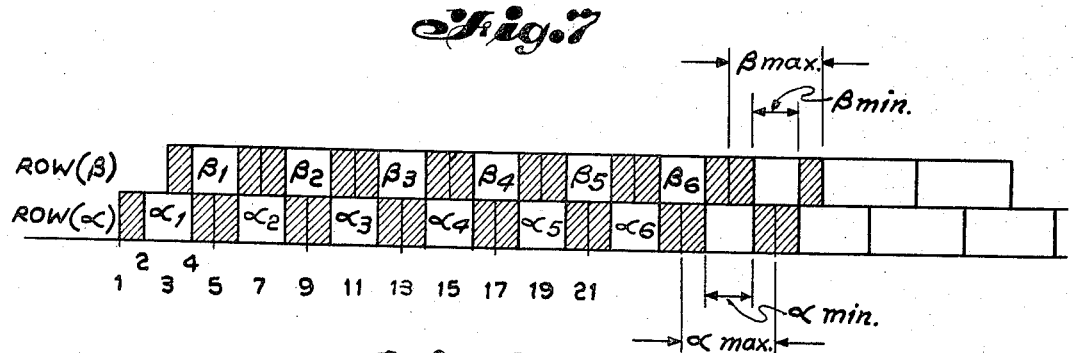
Fig. 7
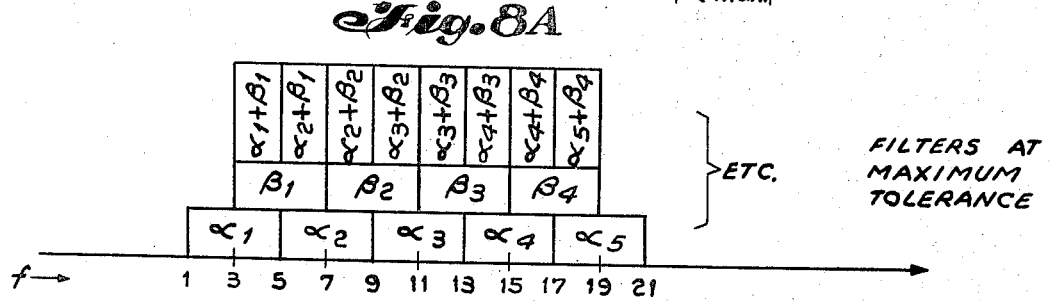
Fig. 8A — FILTERS AT MAXIMUM TOLERANCE
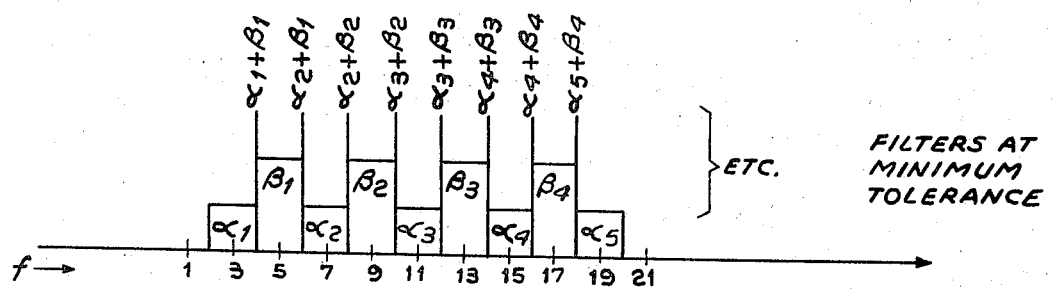
Fig. 8B — FILTERS AT MINIMUM TOLERANCE
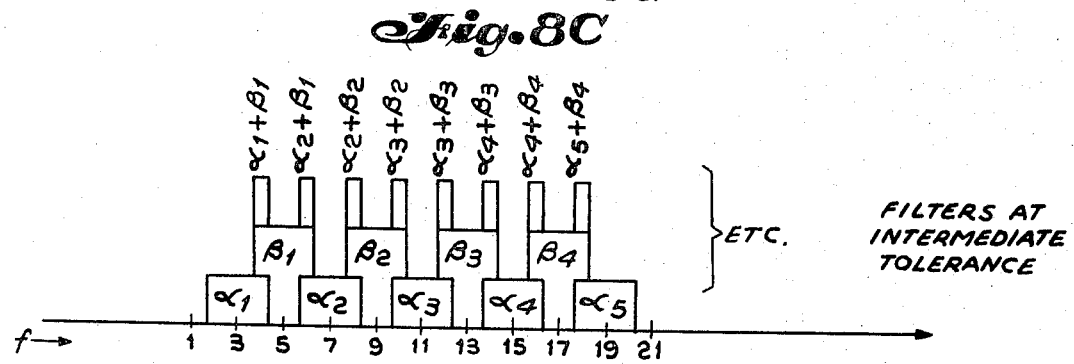
Fig. 8C — FILTERS AT INTERMEDIATE TOLERANCE

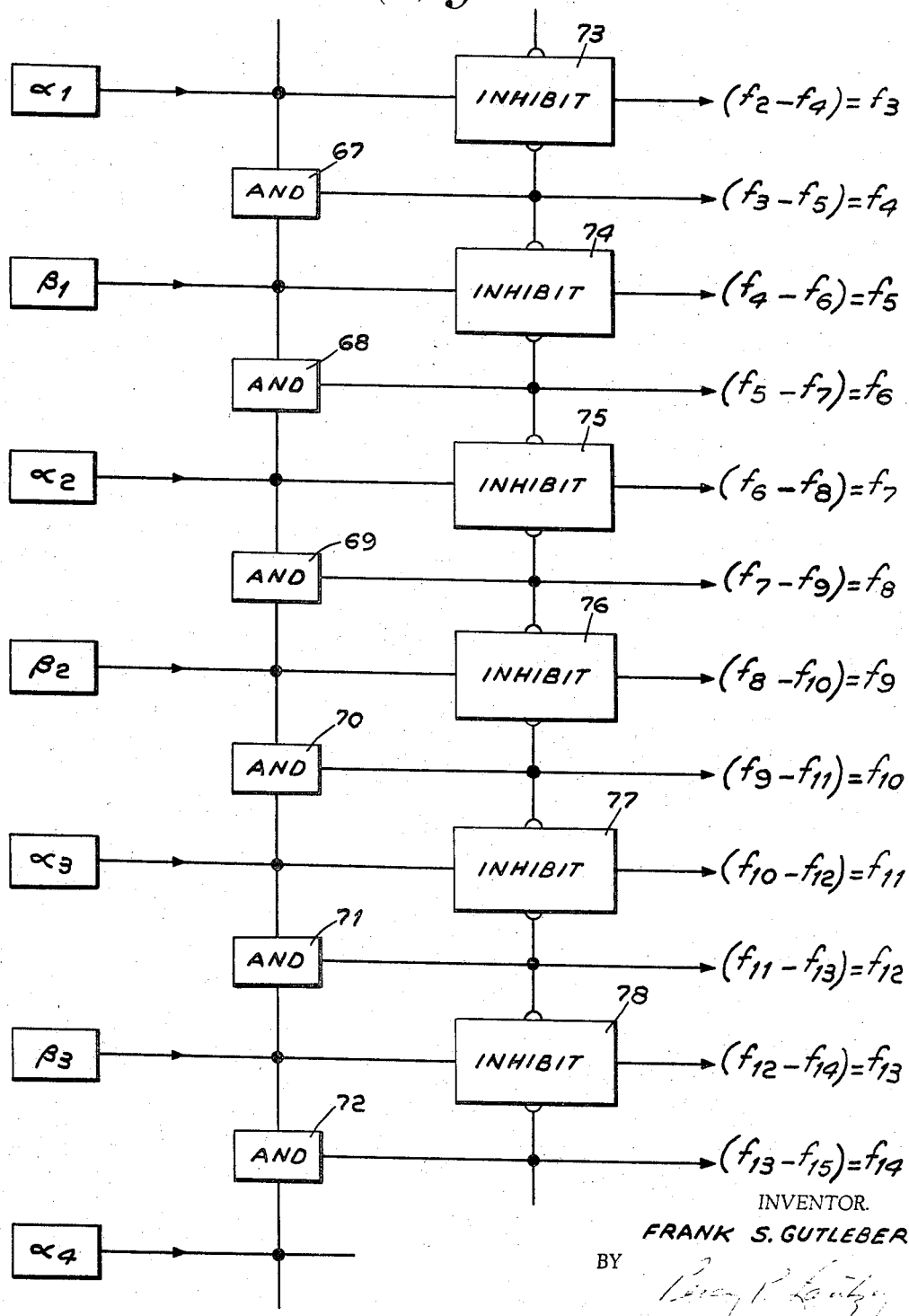

United States Patent Office 3,422,348
Patented Jan. 14, 1969

3,422,348
HIGH RESOLUTION FREQUENCY
SPECTRUM ANALYZER
Frank S. Gutleber, Wayne, N.J., assignor to International Telephone and Telegraph Corporation, Nutley, N.J., a corporation of Maryland
Filed Oct. 12, 1965, Ser. No. 495,296
U.S. Cl. 324—77                                    1 Claim
Int. Cl. G01r 23/16; G01r 23/18

ABSTRACT OF THE DISCLOSURE

A plurality of narrow bandwidth filters each covering a different band of frequencies within the frequency spectrum of the input signal to be analyzed wherein the frequency bands of the filters overlapped by a predetermined amount. The input signal is coupled in parallel to the plurality of filters and logic circuitry is coupled to the output of the filters for unambiguously producing indicating signals representing frequencies in the incoming signal.

---

This invention relates to frequency spectrum analyzers and particularly to such analyzers having a high degree of resolution and using a logic circuit in conjunction with narrow band filters.

An object of the invention is to provide a frequency spectrum analyzer which can resolve the frequency of any spectrum to within any degree desired up to a maximum limit of the tolerance of the filters used.

Another object of the invention is to provide a frequency spectrum analyzer which will have increased frequency resolution when it is not possible to reduce the bandwidth of the individual narrow band filters.

Another object of the invention is to provide a frequency spectrum analyzer in which the filters are used in a staggering scheme with no sacrifice in the tolerance of the bandwidth of individual filters.

Another object of the invention is to provide a frequency spectrum analyzer which will permit comparatively large tolerance for the filters used while still indicating the frequency terms present without ambiguity and with improvement in resolution.

Still another object of the invention is to provide a frequency spectrum analyzer with improved resolution and without concealing frequency terms within the bandwidth of individual filters.

Another object of the invention is to provide a frequency spectrum analyzer in which the ultimate resolution obtainable is only a function of the tolerance of the individual filters used and the maximum resolution obtainable is equal to the tolerance of the filters.

Still another object of the invention is to provide a frequency spectrum analyzer which will identify unambiguous frequency terms and will not conceal frequency terms separated by more than a predetermined number of cycles.

Still another object of the invention is to provide a frequency spectrum analyzer in which the filters used are not required to have an attenuation slope approaching infinity.

The above objects of the invention are accomplished by means of narrow band filters arranged in rows with the bandwidths of the filters of each row overlapping by a predetermined amount the bandwidths of the filters of the other rows, such filters being used in conjunction with a logic circuit of gates by means of which ambiguous indications of individual frequencies are obtained.

The invention is illustrated in the accompanying drawings, in which:

FIG. 1 is a diagram showing the technique of arranging the rows of filters;

FIG. 2 is a diagram of another arrangement of filters showing an improved version of the basic arrangement of FIG. 1;

FIG. 3 is a block diagram of the logic circuit for the arrangement illustrated in FIG. 2;

FIG. 4 is a diagram of the filter arrangement showing a different number of rows of the filters;

FIG. 6 is a diagram of a preferred arrangement of the filters showing the rows of filters arranged in groups of such rows;

FIG. 7 is a diagram useful in explaining the effect of the grouping of the rows, as shown in FIG. 6;

FIG. 8 is a diagram useful in explaining the arrangement of FIG. 6 with respect to maximum, minimum, and intermediate tolerances of the filters;

FIG. 9 is a block diagram illustrating the logic circuit for the groups of filter rows, showing the frequency bands obtainable from each group but without showing the individual filters.

Figure 5:
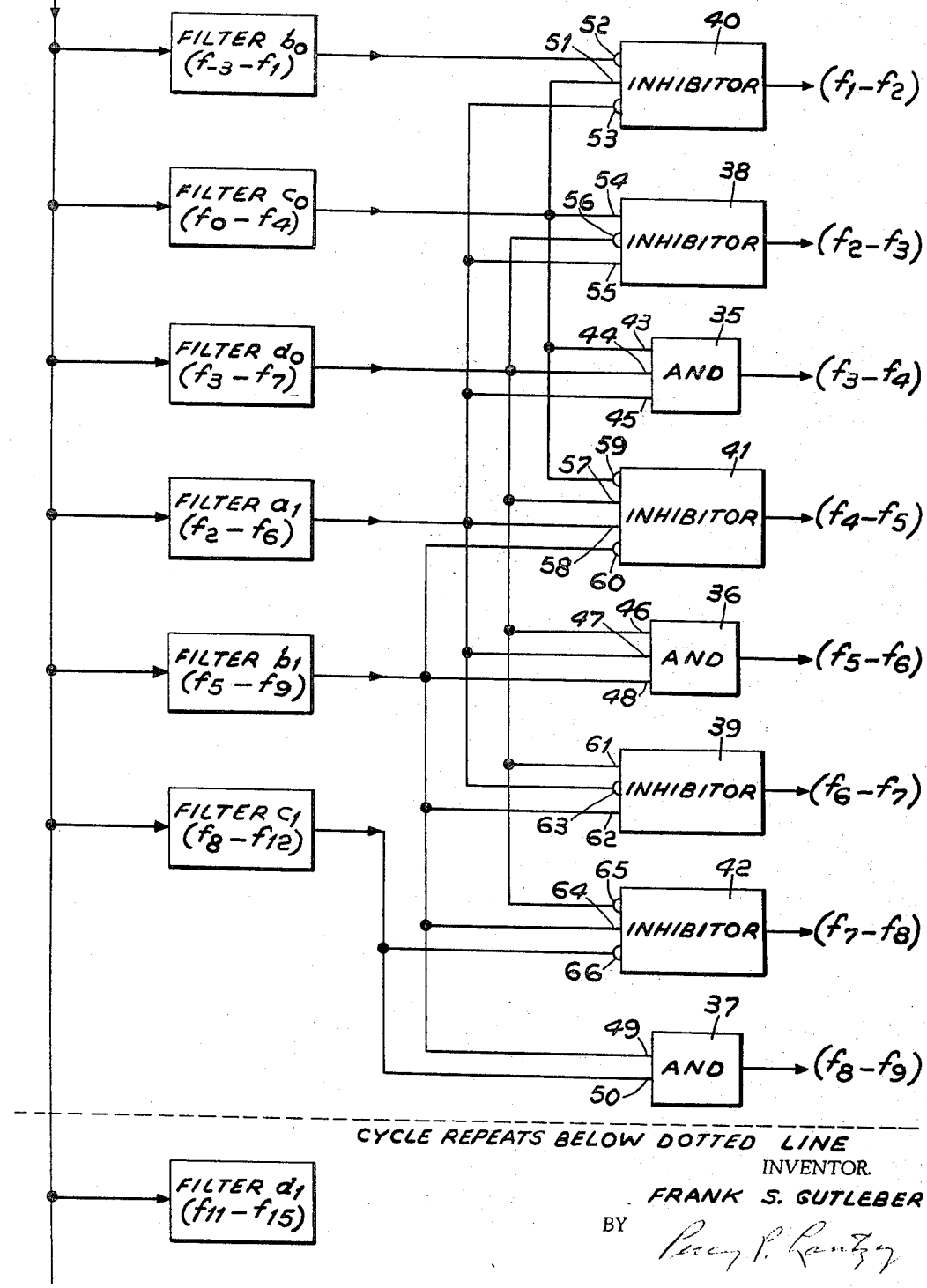
FIG. 5 is a block diagram of the circuit for the filter arrangement of FIG. 4.

One reason for desiring to improve the resolution of a frequency analyzer occurs when the bandwidth of the gang of filters has reached its maximum limit with respect to how narrow it can be beuause of stability considerations. Suppose that the narrowest the bandwidth can be is, say, 100 cycles and it is desired to resolve the frequency to within 25 cycles with a gang of filters each 100 cycles wide. It will be shown how this may be accomplished.

Referring now more specifically to the drawings, the general technique of interleaving the filters, or, in other words, arranging the filters so that their frequency bandwidths overlap, in order to provide high resolution for the analyzer, is illustrated in FIG. 1. Here, four groups, $a$, $b$, $c$, and $d$, of filters are shown for improving the resolution of a single group by a factor of four. It will be shown later how improvement in the resolution may be obtained to any degree desired. The filters have equal bandwidths W, and the filters of each group are arranged in a row with their bandwidths arranged in sequence without overlapping. The sequence of bandwidths covers the entire frequency spectrum contained in the signal to be analyzed. By way of example, the filter $a_2$ is indicated as including frequencies $f_1$ to $F_5$; the filter $a_3$, frequencies $f_5$ to $f_9$; the filter $a_4$, frequencies $f_9$ to $f_{13}$; etc., throughout the spectrum of the incoming signal.

Since four rows of filters are shown, each row is shifted in the same direction with respect to the next row a number of bandwidth cycles equal to ¼ of the filter bandwidth W. Thus, filter $c_3$ of row $c$ covers frequencies $f_7$ to $f_{11}$, since it lies immediately above those frequencies marked off below row $a$ of filters.

Now if a vertical line is projected upwardly within one of the bands, as, for example, the dotted line between frequencies $f_2$ and $f_3$, the blocks intersected represent the combination of outputs necessary to insure that a frequency is present in that band. The dotted line between $f_2$ and $f_3$ extends through $a_2$, $b_2$, $c_1$, and $d_1$, and all four of these outputs must be simultaneously present to define the band indicated. If these four outputs are steered to a common AND circuit, then the output of this AND circuit will uniquely define the band in question.

If the projected line is right at the edge of a filter, an output would be produced from each of the two adjacent filters which would produce an ambiguous indication. Therefore, the outputs of the two filters concerned will have to be inhibited to avoid ambiguity.

In the following explanation, the frequency bands will be designated $f_1-f_2$; $f_2-f_3$; $f_3-f_4$; $f_4-f_5$; etc. The arrangement of FIG. 1 provides a resolution increase of 4 to 1, and the necessary shift of the filters with respect to their frequency bandwidths is equal to the filter bandwidth W divided by the number of rows $n$. Thus row $b$ is shifted by ¼ of W to the right of row $a$; row $c$ is shifted by ¼ of W to the right of row $b$; and row $d$ is shifted by ¼ of W to the right of row $c$.

Before presenting the logic and circuitry for the system, the special case of a frequency term occurring at the edge of a filter frequency band will be considered. Take, for example, the frequency $f_7$. It occurs at the junction of filters $c_2$ and $c_3$. While the outputs of $a_3$, $b_3$, and $d_2$ will indicate this frequency, this is not unique, since outputs of these three filters could also be present with $c_2$ or $c_3$. For this reason it is necessary to inhibit the outputs of both $c_2$ and $c_3$ to insure their absence when frequency $f_7$ is present. The logic circuitry for this case would then be arranged to steer the outputs of $a_3$, $b_3$, and $d_2$ into a circuit which would then only respond if no signal were received from $c_2$ and $c_3$. The output of this circuit would then uniquely define the frequency $f_7$.

The logic defining the frequency bands may be determined from the diagram of FIG. 1 and is presented in the following table:

$b_1+c_1+d_1+$NOT $a_1+$NOT $a_2=f_1$ ($a_1$ and $a_2$ inhibited)
$a_2+b_1+c_1+d_1=f_1-f_2$
$a_2+c_1+d_1+$NOT $b_1+$NOT $b_2=f_2$ ($b_1+b_2$ inhibited)
$a_2+b_2+c_1+d_1=f_2-f_3$
$a_2+b_2+d_1+$NOT $c_1+$NOT $c_2=f_3$ ($c_1+c_2$ inhibited)
$a_2+b_2+c_2+d_1=f_3-f_4$
$a_2+b_2+c_2+$NOT $d_1+$NOT $d_2=f_4$ ($d_1+d_2$ inhibited)
$a_2+b_2+c_2+d_2=f_4-f_5$ The cycle repeats itself with the next band ($f_5-f_6$) where each subscript is simply increased by one digit. This process continues to the end of the frequency band to be analyzed. It is therefore only necessary to write the logic over one filter frequency band W from the diagram. After this the logic is duplicated and it is no longer necessary to refer to the diagram.

For the arrangement shown in FIG. 1, the number N of filters required for the general case is:

$$N = \frac{B}{W} \times n$$

where B is the bandwidth of the signal to be analyzed, W is the filter bandwidth, and $n$ is the number of rows of filters.

The resolution R is given by:

$$R = W/n$$

Thus the resolution improvement is proportional to the number of rows at a sacrifice of requiring an increase in the quantity of filters that is in itself proportional to the number of rows. However, I have found that I can reduce the number of filters required by making more efficient use of them by means of the arrangement shown in FIG. 2. Here the same type of filters with the same characteristics are used and therefore I have used the same reference characters to identify them. The only difference is that the filters of each row are separated with respect to their frequency bandwidths. This also has the additional effect of eliminating the necessity of having a close tolerance for the bandwidths of the individual filters. In the arrangement of FIG. 1, if two of the frequency bands of a given row overlapped, then an output would be obtained in two bands for one frequency term. In the arrangement of FIG. 2, this condition could not occur.

In the diagram of FIG. 2, it has been assumed that it is desired to improve the resolution by a factor of three. Thus, three rows, $(a)$, $(b)$, and $(c)$ of filters are shown, the filters of each row being separated from each other by the number of cycles in the bandwidth of a filter. The rows have been shifted with respect to the frequency spectrum by the number of cycles equal to $W(n-1)/n$, or, in this case, ⅔W.

The required quantity of filters is only half that of the arrangement of FIG. 1. If N represents the number of filters in the arrangement of FIG. 2, then $$N' = \frac{B}{2W} \times n = \frac{B}{W} \times \frac{n}{2} = \frac{N}{2}$$

where N is the quantity of filters required for the arrangement of FIG. 1.

The resolution R' for the arrangement of FIG. 2 is $$R' = W/n = R$$

where R is the resolution of the arrangement of FIG. 1.

The logic for the system of FIG. 2 may be determined in the same manner as for the arrangement of FIG. 1. The following table shows how the outputs of the filters are combined:

$a_1+$NOT $c_0+$NOT $b_1=f_1-f_2$ ($c_0$ and $b_1$ inhibited)
$a_1+b_1=f_2-f_3$
$b_1+$NOT $a_1+$NOT $c_1=f_3-f_4$ ($a_1$ and $c_1$ inhibited)
$b_1+c_1=f_4-f_5$
$c_1+$NOT $b_1+$NOT $a_2=f_5-f_6$ ($b_1$ and $a_2$ inhibited)
$a_2+c_1=f_6-f_7$ The next term begins a new cycle where each subscript is increased by one.

The circuitry for the filter arrangement of FIG. 2 is shown in FIG. 3. Here the filters $c_0$, $a_1$, $b_1$, $c_1$, $a_2$, and $b_2$ are shown, these being all that are necessary for an understanding of the circuit. The circuit repeats itself after the filter $a_2$, beginning with filter $b_2$. AND gates 10, 11, and 12 and inhibitor gates 13, 14, 15, and 16 are shown. Each of the AND gates 10, 11, and 12, have two inputs both of which must receive a signal for the gate to produce an output. AND gate 10 has its two inputs 17 and 18 connected respectively to the outputs of filters $a_1$ and $b_1$. Hence a frequency term occurring in the overlapping portion of the frequency bands of these two filters will operate the AND gate and produce an indication of a frequency in the range between $f_2$ and $f_3$. AND gate 11 has its two inputs 19 and 20 connected respectively to the outputs of filters $b_1$ and $c_1$. Hence a frequency term occurring in the overlapping portions of the frequency bands of these two filters will operate AND gate 11 to produce an indication at its output of frequency terms between $f_4$ and $f_5$. AND gate 12 has its two inputs 21 and 22 connected respectively to the outputs of filters $c_1$ and $a_2$ and hence will produce an indication on its output of a frequency term occurring in the overlapping frequency bands of filters $c_1$ and $a_2$.

Inhibitor gate 13 has one normal input 23 and two inhibitor inputs 24 and 25. The normal input 23 is connected to the output of filter $a_1$. Inhibitor inputs 24 and 25 are connected respectively to the outputs of filters $c_0$ and $b_1$. The arrangement is such that no output indicating a frequency between $f_1$ and $f_2$ can be produced by the inhibitor gate 13 unless there is an output from the filter $a_1$ and no outputs from filters $c_0$ and $b_1$ on inputs 24 and 25. In like manner inhibitor gate 14 has a normal input 26 and two inhibitor inputs 27 and 28. The normal input 26 is connected to the output of filter $b_1$, while inhibitor inputs 27 and 28 are connected respectively to the outputs of filters $a_1$ and $c_1$. The inhibitor gate 14 will produce no output indicating a frequency between $f_3$ and $f_4$ unless there is an output from filter $b_1$ and no outputs from filters $a_1$ and $c_1$. Inhibitor gate 15 is also provided with a normal input 29 and two inhibitor inputs 30 and 31. The normal input 29 is connected to the output of filter $c_1$, while the inhibitor inputs 30 and 31 are connected respectively to the outputs of filters $b_1$ and $a_2$. This inhibitor gate will not produce an output indicating a frequency between $f_5$ and $f_6$ unless there is a signal on the input 29 from filter $c_1$ and no signals on the inputs 30 and 31 from the filters $b_1$ and $a_2$, respectively. Inhibitor gate 16 is similarly provided with a normal input 32 and two inhibitor inputs 33 and 34. The normal input 32 is connected to the output of the filter $a_2$, while the inhibitor inputs 33 and 34 are connected respectively to the outputs of filters $c_1$ and $b_2$. The inhibitor gate 16 will not produce an output indicating a frequency between $f_7$ and $f_8$ unless a signal appears on its normal input 32 from filter $a_2$ and no input appears on both inhibitor inputs 33 and 34 from $c_1$ and $b_2$, respectively.

Below the dotted line at the bottom of the figure the cycle repeats itself, so that it is not thought necessary to show the additional filters and gates, although it will be understood that additional filters and gates will be required for analyzing a wider signal spectrum band.

While the table given above and the diagrams of FIGS. 2 and 3 represent the case where three rows of filters are used, a similar logic diagram and circuit can be readily developed for any desired quantity $n$ of rows with a resulting resolution improvement of $n$ and a percentage increase in the required number of filters proportional to $n/2$.

In FIG. 4 an arrangement using four rows of filters is illustrated with the rows being labelled $a$, $b$, $c$, and $d$ and the filters of each row being identified with the letter of the row and subscript numerals. The spacing between filters in each row with respect to frequency band width is equal to the bandwidth of an individual filter. As shown, the filters of row $b$ are shifted with respect to those of row $a$ by a frequency spacing equal to $$W(n-1)/n$$

or ¾W, where W is the frequency bandwidth of a filter and $n$ is the number of rows.

The following table represents the necessary logic circuit for this arrangement of filters:

$c_0$+NOT $b_0$+NOT $a_1=f_1-f_2$ ($b_0$ and $a_1$ inhibited)
$a_1+c_0$+NOT $d_0=f_2-f_3$ ($d_0$ inhibited)
$a_1+c_0+d_0=f_3-f_4$
$a_1+d_0$+NOT $c_0$+NOT $b_1=f_4-f_5$ ($c_0$ and $b_1$ inhibited)
$a_1+b_1+d_0=f_5-f_6$
$b_1+d_0$+NOT $a_1=f_6-f_7$ ($a_1$ inhibited)
$b_1$+NOT $d_0$+NOT $c_1=f_7-f_8$ ($d_0$ and $c_1$ inhibited)
$b_1+c_1=f_8-f_9$ The next term begins a new similar cycle where each subscript is increased by one.

FIG. 5 is a block diagram of the logic circuit for the filter arrangement of FIG. 4. Here filters $b_0$, $c_0$, $d_0$, $a_1$, $b_1$, $c_1$, and $d_1$ are shown, the circuit repeating itself below the dotted line. In addition to AND gates 35, 36, and 37, three types of inhibitor gates are used. Inhibitor gates 38 and 39 have two normal inputs and one inhibitor input and inhibitor gates 40 and 42 have one normal input and two inhibitor inputs, while inhibitor gate 41 has two normal inputs and two inhibitor inputs.

AND gate 35 has its three inputs 43, 44, and 45 connected respecively to the outputs of filters $c_0$, $d_0$, and $a_1$. AND gate 36 has its three inputs 46, 47, and 48 connected respectively to the outputs of filters $d_0$, $a_1$, and $b_1$. AND gate 37 has its two inputs 49 and 50 connected respectively to the outputs of filters $b_1$ and $c_1$.

Inhibitor gate 40 has its normal input 51 connected to the output of filter $c_0$. The inhibitor inputs 52 and 53 are connected respectively to the outputs of filters $b_0$ and $a_1$. Inhibitor gate 38 has its two normal inputs 54 and 55 connected respectively to the outputs of filters $c_0$ and $a_1$. The inhibitor input 56 is connected to the output of filter $d_0$. Inhibitor gate 41 has its two normal inputs 57 and 58 connected respectively to the outputs of filters $d_0$ and $a_1$ and its inhibitor inputs 59 and 60 connected respectively to the outputs of filters $c_0$ and $b_1$. Inhibitor gate 39 has its two normal inputs 61 and 62 connected respectively to the outputs of filters $d_0$ and $b_1$ and its inhibitor input 63 connected to the output of filter $a_1$. Inhibitor gate 42 has its normal input 64 connected to the output of filter $b_1$ and its inhibitor inputs 65 and 66 to the outputs of filters $d_0$ and $c_1$.

The cycle repeats itself below the dotted line, so that it is unnecessary to show the additional filters and gates.

As thus shown in FIG. 5, frequencies occurring in the incoming signal within the indicated ranges at the right of the figure will be indicated in accordance with the table given above. As can be seen by a comparison of FIGS. 5 and 3, the gating circuit becomes more complicated as the number of rows of filters increases, as more outputs from individual filters are required and additional types of gates are required. If quantities of filters are no problem for a specific application, then perhaps the degree of logic complexity (in terms of circuit quantity) might establish the limit of rows which should be used for a specific application.

The system described can be used whenever it is desired to increase the frequency resolution of a system without being able to reduce the bandwidth of the individual narrow band filters. This limitation might be the result of oscillator stability consideration or perhaps crystal filters used at the carrier might be at their narrowest bandwidth which could be achieved practically.

The staggering system used in FIGS. 2 to 5 results in no sacrifice in the tolerance of the bandwidth of the individual filters. That is, if the filter cutoff frequency had a tolerance of, say, 10% with respect to the final bandwidth resolution desired, then the tolerance for the composite system band determination would be 10%. This would be independent of the number of rows used. The only requirement is that the tolerance be some reasonable fraction of the final resolution.

A second application for the system would be to enable a comparatively large tolerance for the filters and still be able to establish frequency terms present with no sacrifice (in fact an improvement) in the resolution, and accomplish this without having ambiguity occur. It can be shown that a tolerance as poor as 33⅓% of the cutoff frequency of the filter can be allowed and still result in a practical operating system. The output bands will in a sense overlap, but the estimated frequencies resolved will be unique.

The interleaving arrangement of many filters of bandwith W thus far described has one inherent disadvantage: the concealing of frequency terms which are within the bandwidth W. That is, even though the resolution would be improved by a factor of four for four rows, adjacent frequency terms which are within W cycles of each other would only be indicated by one output.

For the arrangement shown in FIGS. 1 and 2, where the bandwidths of adjacent filters abutted against each other, the problem described above does not exist. Two adjacent frequency terms separated by more than $W/n$ cycles would result in two outputs in their appropriate bands. That is, theoretically this configuration does yield the desired results in that no loss of signal can occur. One term could not (in the ideal case) result in more than one output, and only signal terms separated by $W/n$ cycles or less would be concealed or lost. In a practical situation where a tolerance for the filter bands is considered however, the following two problems arise:

(1) If two adjacent bands overlap, then one signal term could yield two outputs.

(2) If two adjacent bands separate leaving a space between them, then a signal term occurring within the space could be completely lost or only determined when the closest adjacent frequency was W cycles away.

A modified arrangement of filters using the same basic philosophy of interleaving the filters but which eliminates the problem indicated above by using different logic circuitry will now be described. It will be shown that for this system the maximum resolution obtainable is exactly equal to the tolerance of the basic filter building blocks of bandwidth W. If the maximum tolerance of bandwidth limits of each filter is designated as $\delta_m$, then the maximum resolution which can be realized is $\delta_m$ cycles, or $n=W/\delta_m$, where $n$ is equal to the number of rows required to realize this condition. Since this system can realize this degree of resolution in the limit, it is considered to be the preferred form of the invention for achieving frequency resolution.

The resulting system may be understood by first considering two groups of $n/2$ rows separately with separate logic circuitry and then combining the outputs of these two groups in a novel way to result in independently defined frequency bands.

The final overall resolution R for the system is $$R=W/n$$

where $n$ again equals the number of rows.

The required number of filters N is $$N=\frac{B}{W}\times n$$

where B equals the frequency spectrum of the signal to be analyzed.

The maximum tolerance $\delta_m$ is $$\delta_m=R=W/n$$

The closest ($\Delta f$) that two frequency terms can be is $$\Delta f=W/n$$

before any signal information can be concealed.

Upon examining the above equations for the general case, it can be seen that a final practical system can be achieved which yields the same resolution improvement as for the previous arrangements but which eliminates all the problems associated with them. The only basic difference over the previous arrangements is in the logic circuitry.

The following analysis presents the manner in which the filters are stacked, the required logic, and the associated circuit diagram for the preferred system. An example will be presented using six rows of filters arranged in two groups of three rows. However, the results are general and can be applied to any number of rows $n$.

The manner in which the rows are stacked is illustrated in FIG. 6. The filters are arranged in two groups, A and B, with three rows in each group, rows $a$, $b$, and $c$ for group A and rows $a'$, $b'$, and $c'$ for group B. The frequency bandwidths of the filters in each row are shifted a number of cycles to the right equal to $2W/n$, where $n$, as before, is the total number of rows and W is the maximum bandwidth of each filter. The shift of the frequency bandwidths between groups is equal to $W/n$. The crosshatched portion at either end of a filter bandwidth represents the tolerance of the filter, the distance between these portions of any filter indicating the minimum frequency bandwidth of the filter. The overlapping portions of the frequency spectrum with respect to the filters of group A are labelled $\alpha_1$, $\alpha_2$, $\alpha_3$, etc., while the overlapping portions of the frequency spectrum of group B are labelled $\beta_1$, $\beta_2$, $\beta_3$, etc. The frequency spectrum is indicated at the bottom of the figure.

Now from the diagram of FIG. 6 it will be seen that frequencies occurring in the $\alpha$ and $\beta$ regions of the frequency spectrum will cause the filters encompassing these frequencies to respond. This response is indicated in the following table.

$\alpha_1 = a_1 + b_0 + c_0 = f_1 - f_5$
$\alpha_2 = a_1 + b_1 + c_0 = f_5 - f_9$
$\alpha_3 = a_1 + b_1 + c_1 = f_9 - f_{13}$, etc.

Also $\beta_1 = a_1' + b_0' + c_0' = f_3 - f_7$
$\beta_2 = a_1' + b_1' + c_0' = f_7 - f_{11}$
$\beta_3 = a_1' + b_1' + c_1' = f_{11} - f_{15}$, etc.

The circuitry required for the above logic equations is simply AND circuits where each AND circuit gives an output for the appropriate three inputs and the defined bands are those indicated above. Note however that an output for both $\alpha_2$ and $\beta_2$ could be present when only one input exists, because of the overlapping of these portions of the frequency spectrum. This problem is eliminated by not using the above outputs (which actually have not yet resolved the frequency to the full capacity of the system) directly. These outputs are in turn fed into additional logic circuitry which will now be explained.

Before discussing the system further, it should be mentioned that the following analysis for the continuation of the description is completely general and holds regardless of the number of rows of filters used to obtain the functions $\alpha$ and $\beta$. That is, if ten rows ($n=10$) were used for a specific system, then each $\alpha_n$ and $B_n$ band would be achieved from five appropriate inputs into an AND circuit. The resolution would simply be better by the appropriate figure.

In order to understand what is occurring, the defined frequency bands have been represented in FIG. 7, and reference is made to that figure with respect to the analysis which follows. In this figure, the $\alpha$ portions of the frequency spectrum, which are shown in connection with rows $a$, $b$, and $c$ of the A group in FIG. 6, are represented as a single row of bands, as are also the $\beta$ portions of the spectrum which are shown in connection with rows $a'$, $b'$, and $c'$ of the B group of filters. The shaded areas represent the tolerance for the $\alpha$ and $\beta$ bands. The set of equations given above in connection with FIG. 6 corresponds to the maximum limits for the bands.

The form and symmetry of the diagram of FIG. 7 would be the same regardless of the initial number of rows used. To achieve this, the required shift of the rows and groups must be as shown in FIG. 6. For the $\alpha$ and $\beta$ bands, the minimum value of each is exactly equal in magnitude to the tolerance $\delta_m$ of the original physical filters used of bandwidth W.

FIGS. 8A, 8B, and 8C are provided in order to aid in understanding the logic equations which will be developed later from FIG. 7. FIGS. 8A and 8B illustrate respectively the existing conditions at the maximum and minimum tolerances and FIG. 8C illustrates the conditions at a point between these two extremes.

If a frequency term exists in a band of $\alpha+\beta$, then there should be no output from the individual frequency bands making up the composite filter band. That is, if a spectral line is within, say, $\alpha_3+\beta_2$, then it is necessary to operate on the individual bands of $\alpha_3$ and $\beta_2$ to prevent an output from occurring from these bands. This is necessary to prevent a single frequency term from providing more than one output. This condition will result in the concealment of an adjacent frequency that is less than $W/n$ cycles away. However, this is of no consequence, since this corresponds to the final resolution for the system.

Now as any band defined by $\alpha+\beta$ shrinks because of the tolerance of the initial filters, a condition could occur where a signal would only be present in $\alpha$ or $\beta$ and not in both. This condition, however, can only occur within a minimum bandwidth, as illustrated in FIG. 8B. Therefore an output from either $\alpha$ or $\beta$ without either of the two adjacent combinations of $\alpha+\beta$ being present is uniquely defined in the bands shown in FIG. 8B. As the tolerance goes from the minimum value shown in FIG. 8B to the maximum value shown in FIG. 8A, the bandwidth defined by $\alpha$ alone or $\beta$ alone reduces to zero cycles.

The required logic and circuitry which will meet all the required conditions described above will now be explained with reference to FIGS. 6, 7, 8A, 8B, and 8C, and keeping in mind the conditions set forth in the above paragraph. The following table gives the required logic equations for the outputs of $\alpha$ and $\beta$ portions of the frequency spectrum:

| | Define as— | | Note |
|---|---|---|---|
| (1) $\alpha_1 = f_2 - f_4$ | | $f_3$ | |
| (2) $\alpha_1 + \beta_1 = f_3 - f_5$ | | $f_4$ | This output must prevent an output from $\alpha_1$ alone or $\beta_1$ alone. |
| (3) $\beta_1 = f_4 - f_6$ | | $f_5$ | |
| (4) $\alpha_2 + \beta_1 = f_5 - f_7$ | | $f_6$ | This output must prevent an output from $\alpha_2$ alone or $\beta_1$ alone. |
| (5) $\alpha_2 = f_6 - f_8$ | | $f_7$ | |
| (6) $\alpha_2 + \beta_2 = f_7 - f_9$ | | $f_8$ | This output must prevent an output from $\alpha_2$ alone or $\beta_2$ alone. |
| (7) $\beta_2 = f_8 - f_{10}$ | | $f_9$ | |

The fifth term above repeats the cycle and the remaining logic equations for filling up the entire incoming signal spectrum can be written down by inspection from this point. The bands keep increasing by one digit and the terms on the left side keep increasing by one digit.

The logic equations expressed completely in computer terminology are:

Define as (1) $\alpha_1 + \text{NOT}(\alpha_1 + \beta_0) + \text{NOT}(\alpha_1 + \beta_1) = f_2 - f_4$ ---- $f_3$
(2) $\alpha_1 + \beta_1 = f_3 - f_5$ ---- $f_4$
(3) $\beta_2 + \text{NOT}(\alpha_1 + \beta_1) + \text{NOT}(\alpha_2 + \beta_1) = f_4 - f_6$ ---- $f_5$
(4) $\alpha_2 + \beta_1 = f_5 - f_7$ ---- $f_6$ The next group starts a new cycle.

(5) $\alpha_2 + \text{NOT}(\alpha_2 + \beta_1) + \text{NOT}(\alpha_2 + \beta_2) = f_6 - f_8$ ---- $f_7$
(6) $\alpha_2 + \beta_2 = f_7 - f_9$ ---- $f_8$
(7) $\beta_2 + \text{NOT}(\alpha_2 + \beta_2) + \text{NOT}(\alpha_3 + \beta_2) = f_8 - f_{10}$ ---- $f_9$
(8) $\alpha_3 + \beta_2 = f_9 - f_{11}$ ---- $f_{10}$ The next group starts a new cycle.

(9) $\alpha_3 + \text{NOT}(\alpha_3 + \beta_2) + \text{NOT}(\alpha_3 + \beta_3) = f_{10} - f_{12}$ ---- $f_{11}$
(10) $\alpha_3 + \beta_3 = f_{11} - f_{13}$ ---- $f_{12}$
(11) $\beta_3 + \text{NOT}(\alpha_3 + \beta_3) + \text{NOT}(\alpha_4 + \beta_3) = f_{12} - f_{14}$ ---- $f_{13}$
(12) $\alpha_4 + \beta_3 = f_{13} - f_{15}$ ---- $f_{14}$ These equations continue in the same form throughout the signal frequency band where each group of four equations comprises one cycle. Three cycles are shown in the above table.

In FIG. 9 a block diagram is shown of the circuitry for performing the logic of the above table, the frequency bands of the filter combinations being represented by $\alpha$ and $\beta$ blocks. The gates 67 to 72 shown in the central vertical row are AND gates, as so labelled, each having two inputs. The gates 73 to 78 in the vertical row at the right are inhibitor gates, each with one normal input and two inhibitor inputs.

AND gate 67 has its two inputs connected respectively to the outputs of the blocks $\alpha_1$ and $\beta_1$. AND gate 68 has its two inputs connected respectively to the outputs of the blocks $\beta_1$ and $\alpha_2$. AND gate 69 has its two inputs connected respectively to the outputs of blocks $\alpha_2$ and $\beta_2$. AND gate 70 has its two inputs connected respectively to the outputs of blocks $\alpha_2$ and $\beta_3$. AND gate 71 has its two inputs connected respectively to the outputs of blocks $\alpha_3$ and $\beta_3$. And AND gate 72 has its two inputs connected respectively to the outputs of blocks $\beta_3$ and $\alpha_4$. The rest of the AND gates in that vertical row which have not been shown are similarly connected.

The inhibitor gate 73 has its normal input connected to the output of block $\alpha_1$ and its two inhibitor inputs connected respectively to the output of an AND gate (not shown, whose input is connected to the output of block $\alpha_1$) and to the output of the AND gate 67. Inhibitor gate 74 has its normal input connected to the output of block $\beta_1$ and its inhibitor inputs connected respectively to the outputs of AND gates 67 and 68. Inhibitor gate 75 has its normal input connected to the output of $\alpha_2$ and its inhibitor inputs connected respectively to the outputs of AND gates 68 and 69. Inhibitor gate 76 has its normal input connected to the output of block $\beta_2$ and its inhibitor inputs connected respectively to the outputs of AND gates 69 and 70. Inhibitor gate 77 has its normal input connected to the output of block $\alpha_3$ and its inhibitor inputs connected respectively to the outputs of AND gates 70 and 71. And inhibitor gate 78 has its normal input connected to the output of block $\beta_3$ and its inhibitor inputs connected respectively to the outputs of AND gates 71 and 72. The remaining inhibitor gates in that vertical row have not been shown but are connected in a similar manner.

The outputs of the system are indicated on the right. An output from inhibitor gate 73 will represent the frequency $f_3$. An output from AND gate 67 will represent the frequency $f_4$. An output from inhibitor gate 74 will represent the frequency $f_5$, and so on, the inhibitor gates producing signals representing the odd numbered frequencies and the AND gates producing outputs representing the even numbered frequencies, all as indicated at the right of the figure.

Figure 10:
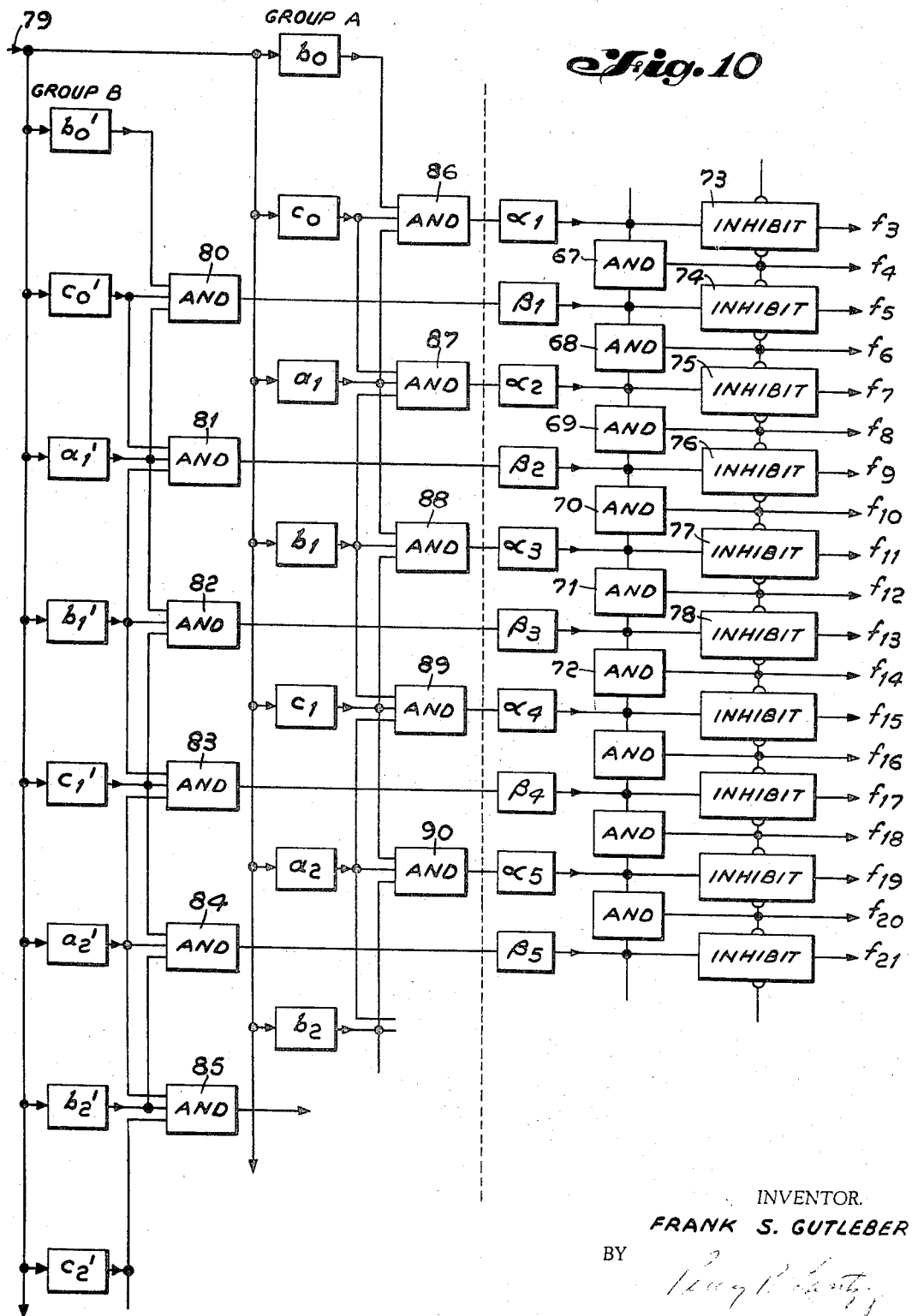
FIG. 10 is a complete block diagram of the logic circuit for the arrangement of FIG. 6 and showing the individual filters.

Now from the diagram of FIG. 9 and the table given in connection with FIG. 6 the complete circuit diagram can be drawn and is shown in FIG. 10. The $a$'s, $b$'s, and $c$'s represent the actual physical filters of bandwidth W, whereas the $\alpha$'s and $\beta$'s correspond to bands achieved through logic circuitry and are not physical circuits.

The diagram to the right of the vertical dotted line is the same as FIG. 9 with the exception that a few more $\alpha$ and $\beta$ bands and associated gates have been included. Accordingly it is not believed necessary to explain it further in detail. The circuit to the left of the dotted line includes the filters and the gating circuitry which produces the bands represented by the $\alpha$ and $\beta$ blocks to the right of the dotted line. This circuit will now be described.

The rectangles in the first vertical row at the left of the figure are the filters of group B shown in FIG. 6. These are labelled $a'$, $b'$, and $c'$ for the three rows of filters of the group with subscripts denoting the position of the filters in the row. Similarly, the rectangles in the third vertical row are the filters $a$, $b$, and $c$ of FIG. 6 with subscripts denoting the position of the filters in the row. The lead 79 is the input for the system and feeds all of these filters in parallel.

The rectangles 80 to 85 in the second vertical row from the left are AND gates for the filters of group B, each having three inputs. AND gate 80 has its three inputs connected respectively to the outputs of filters $b_0'$, $c_0'$, and $a_1'$. The inputs of AND gate 81 are connected respectively to the outputs of filters $c_0'$, $a_1'$, and $b_1'$. The inputs of AND gate 82 are connected respectively to the outputs of filters $a_1'$, $b_1'$, and $c_1'$. The inputs of AND gate 83 are connected respectively to the outputs of filters $b_1'$, $c_1'$, and $a_2'$. The inputs of AND gate 84 are connected respectively to the outputs of filters $c_1'$, $a_2'$, and $b_2'$. And the inputs of AND gate 85 are connected repectively to the outputs of filters $a_2'$, $b_2'$, and $c_2'$.

The rectangles 86 to 90 in the fourth vertical row are AND gates for the filters of the group A. Each of these has three inputs. AND gate 86 has its three inputs connected respectively to the outputs of filters $b_0$, $c_0$, and $a_1$. AND gate 87 has its three inputs connected respectively to the outputs of filters $c_0$, $a_1$, and $b_1$. AND gate 88 has its three inputs connected respectively to the outputs of filters $a_1$, $b_1$, and $c_1$. AND gate 89 has its three inputs connected respectively to the outputs of filters $b_1$, $c_1$, and $a_2$. And AND gate 90 has its three inputs connected respectively to the outputs of filters $c_1$, $a_2$, and $b_2$.

As indicated at the right of the dotted line, the outputs of the AND gates 86 to 90 produce respectively the $\alpha$ bands 1 to 5, while the outputs of AND gates 80 to 84 produce respectively the $\beta$ bands 1 to 5.

The circuitry continues in the form shown throughout the input spectrum bandwidth. Thus the number of filters and gate circuits will depend on the width of the spectrum which is to be analyzed. Also the logic circuitry at the right of the vertical dotted line would be the same, except for magnitude, for any quantity of rows used in the system.

The circuit diagram illustrated in FIG. 10 corresponds to six rows of filters in two groups of three rows each and achieves a final resolution of $W/n=W/6$. That is, if the bandwidth of the physical filters was 60 cycles, then the final resolution of the system would be 10 cycles. Also the maximum allowable tolerance for the filters would be 10 cycles.

The system is completely general and the required circuit for any number of rows is easily determined. In all cases the circuitry to the right of the dotted line of FIG. 10 is the same regardless of the number of rows used for the system. Of course the magnitude of the frequency separation between the output terms would be different. These output bands would have a resolution corresponding to $W/2n$, where $n$ is equal to the number of rows. Since no two adjacent terms could be present simultaneously, as may be seen from an examination of FIG. 10, the final resolution obtained is $W/n$.

It will be seen from the above that I have provided a spectrum analyzer which utilizes interleaved filters in conjunction with a logic circuitry which can resolve the frequency of any spectrum to within any degree desired up to a maximum limit of the tolerance of the filters used. Filters having an attenuation slope approaching infinity are not required. The sloping portion of the attenuation curve can be considered as part of the tolerance of the filter.

The invention is not to be limited to what has been shown and described except by the limitations contained in the appended claims.

What I desire to claim and secure by Letters Patent is:

1. A frequency spectrum analyzer comprising:

a plurality of narrow-bandwidth filters, each covering a different band of frequencies within the frequency spectrum to be analyzed, the frequency bands of said filters overlapping by a predetermined amount;

means for feeding a signal to be analyzed to all said filters in parallel;

a plurality of frequency-indicating outputs, each for indicating a different predetermined small frequency range; and gating means connected between the outputs of said filters and said frequency-indicating outputs for producing indicating signals on said frequency-indicating outputs when the signal to be analyzed contains frequencies within a corresponding one of said predetermined small frequency ranges of said frequency spectrum;

said filters having substantially equal bandwidths and arranged in groups of rows, said filters of each row having a frequency bandwidth of a predetermined tolerance which do not overlap but do overlap the bandwidths of said filters of every other row, the bandwidth overlap of said filters between two rows of a group being equal to the ratio of the number of groups of rows to the total number of rows times the frequency bandwidth of a filter, and the bandwidth overlap between groups of rows being equal to the bandwidth of a filter divided by the number of rows in a group;

said gating means comprising;

[a] first plurality of AND gates, there being one for each filter in each group, each AND gate having three inputs;

[b] means for connecting one input of each AND gate to the output of its associated filter;

[c] means for connecting the other two inputs of each AND gate respectively to the outputs of two adjacent filters with overlapping bandwidths;

[d] a second plurality of AND gates, each having two inputs;

[e] means for connecting the inputs of each of said second plurality of AND gates respectively to the outputs of two of said first plurality of AND gates with responses in adjacent frequency bands;

[f] means for connecting the outputs of said second plurality of AND gates respectively to alternate ones of the frequency indicating outputs;

[g] a plurality of inhibitor gates, each having a normal input and two inhibitor inputs, there being one inhibitor gate for each of the AND gates of said first plurality;

[h] means for connecting the outputs of said first plurality of AND gates respectively to the normal inputs of said inhibitor gates;

[i] means for connecting the inhibitor inputs of each of said inhibitor gates respectively to the outputs of two AND gates of said second plurality with responses in adjacent frequency bands; and

[j] means for connecting the outputs of said inhibitor gates respectively to the other of said frequency indicating outputs.

References Cited

UNITED STATES PATENTS 3,196,212   7/1965   Horwitz et al.
3,215,934   11/1965   Sallen.

RUDOLPH V. ROLINEC, *Primary Examiner.*

P. F. WILLE, *Assistant Examiner.*

U.S. Cl. X.R.

325—333